Dec. 28, 1948.   R. P. SHEA   2,457,409
INTERMITTENT FILM ADVANCING MECHANISM
Filed Sept. 27, 1946   3 Sheets-Sheet 1

ROBERT P. SHEA,
INVENTOR

BY
ATTORNEY.

Dec. 28, 1948.  R. P. SHEA  2,457,409
INTERMITTENT FILM ADVANCING MECHANISM
Filed Sept. 27, 1946  3 Sheets-Sheet 2

ROBERT P. SHEA,
INVENTOR

BY
ATTORNEY.

Dec. 28, 1948.　　　　R. P. SHEA　　　　2,457,409
INTERMITTENT FILM ADVANCING MECHANISM
Filed Sept. 27, 1946　　　　　　　　　　　3 Sheets-Sheet 3
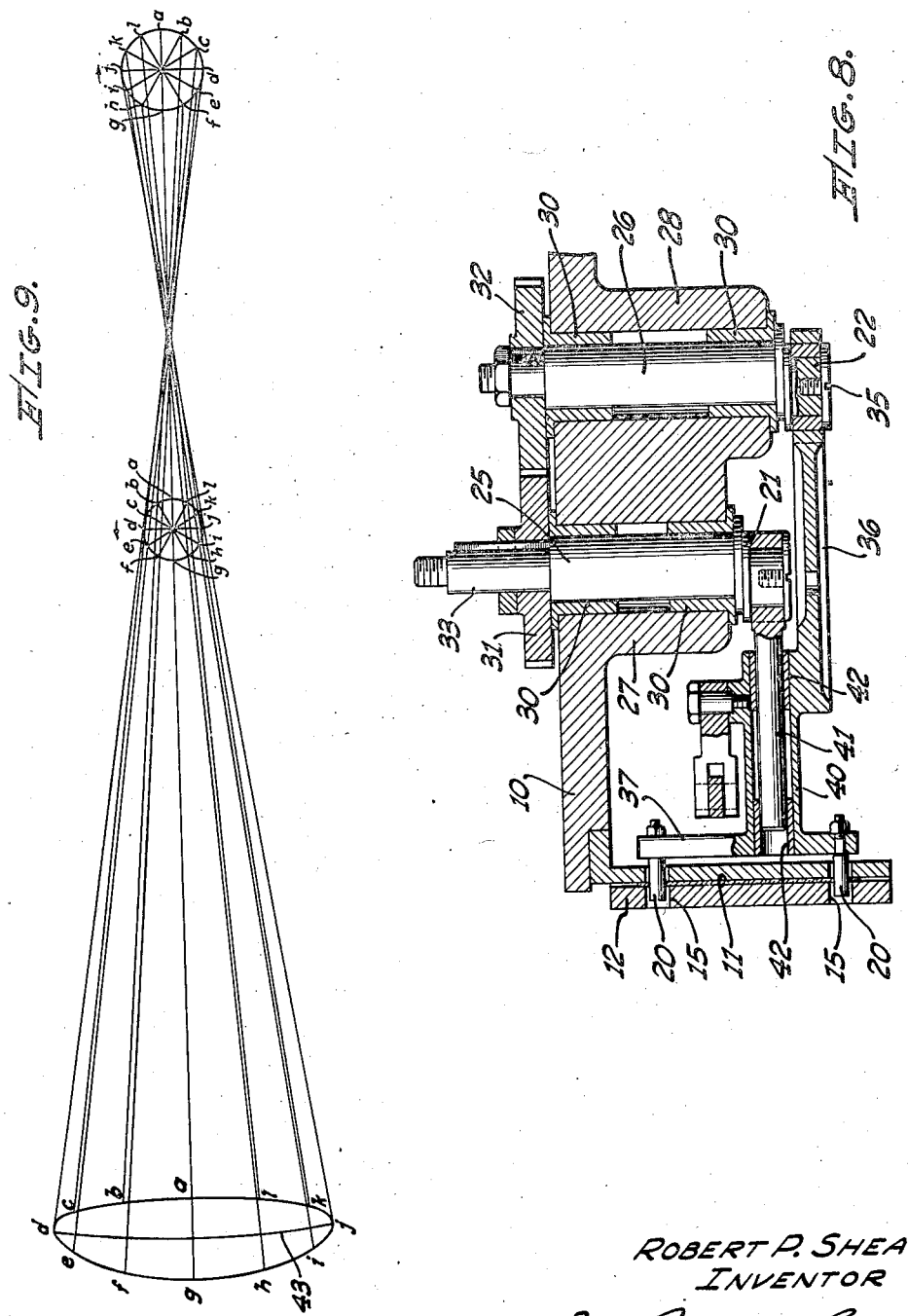
ROBERT P. SHEA,
INVENTOR Patented Dec. 28, 1948

2,457,409

UNITED STATES PATENT OFFICE 2,457,409

INTERMITTENT FILM ADVANCING MECHANISM

Robert P. Shea, North Hollywood, Calif., assignor to Edward Furer, Burbank, Calif., doing business as Acme Tool and Manufacturing Company Application September 27, 1946, Serial No. 699,898

13 Claims. (Cl. 88—18.4)

My invention relates generally to film advancing mechanisms and more particularly to mechanisms such as are used in motion picture cameras and printers to provide intermittent movement of the film therein.

It is well known that motion pictures are usually made by exposing a strip of film to form a series of individual pictures, the film being held stationary during its exposure, and then moved while a shutter prevents light from striking the film. Certain cameras have been developed in which the film is moved continuously, but such cameras are rather rare and are usually used for work involving very rapid motion of the subject, and of the film. A mechanism which provides an intermittent motion of the film is the type most widely used, and has been since the first motion pictures. Various forms of such mechanisms have been developed for providing this motion of the film, one of the earlier types being the Geneva Star which was quite popular for some time.

However, rotary mechanisms of this kind are generally unsatisfactory since they tend to vibrate and cause excessive noise; and, with the introduction of sound motion pictures it became necessary to provide a mechanism which was silent. To overcome the disadvantages of the rotary mechanisms, other movements have been devised which make use of eccentrics, Scotch yokes, and similar constructions, but many of these mechanisms have been so complicated as to defeat their purpose of providing a quiet drive for the film. I have found that certain eccentric mechanisms lend themselves very well to the solution of this problem, and I have developed a mechanism having a very few moving parts, and adapted to give silent, trouble-free service over an extended period of time.

It is therefore a major object of my invention to provide a film advancing mechanism of improved design adapted to produce the required intermittent motion of a film through a camera.

Another object of my invention is to provide such a mechanism which has a minimum of moving parts and gives trouble-free service over an extended period of time.

It is a further object of my invention to provide a mechanism of this type which is quiet in operation and remains so with continued use.

Still another object is to provide a film advancing mechanism for cameras which may be quickly and easily threaded with a minimum of effort on the part of the photographer.

It is a still further object of my invention to provide a film advancing mechanism of this type which produces a minimum of strain upon the film and which advances the latter an accurately measured distance during each cycle of operation.

These and other objects and advantages of my invention will become apparent from the following description of a preferred form thereof, and from the drawings illustrating that form in which Fig. 1 is an end elevational view of my improved film advancing mechanism, as it may appear when removed from the camera, looking at the film exposure aperture;

Fig. 8 is a sectional plan view taken at 8—8 in Fig. 4 and showing the construction of the mechanism operating the film advancing pins; and Fig. 9 is a schematic diagram of the movement of the eccentrics operating the film advancing pins, and the path of movement of the latter.

Figure 1:
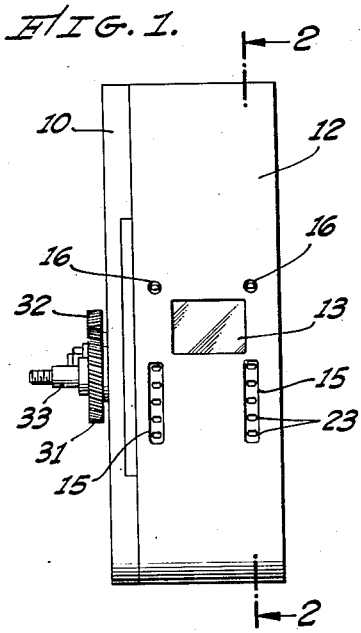

Referring now to the drawings and particularly to Figs. 2 to 5 thereof, the numeral 10 indicates a vertical plate or wall carrying the various elements of the film advancing mechanism, and adapted to fit within a light-tight housing (not shown) of the camera. The housing may be of any of the types customarily used for this purpose, and will normally include a lens (not shown) adapted to focus the image of a scene upon a film 11 which is moved through the housing. The film 11 is generally carried in a removable magazine (not shown) having a supply reel and a take-up reel therein, with the film adapted to travel from the supply reel, through the film advancing mechanism of the camera, and back to the take-up reel. The housing and its appurtenances may be of any suitable type, and in and of themselves I do not claim them as my invention except as they may be modified or combined with other elements described herein.

At the forward end of the vertical plate 10, i. e., the end nearest the lens, I mount an aperture plate 12 perpendicular to the vertical plate and parallel to the plane of the image formed by the lens of the camera. An exposure aperture 13 of the proper size is formed in the aperture plate 12, and the film 11 is moved along the rear of the plate and past the aperture so that a series of images may be formed on the film. A pressure plate (not shown) of any suitable type is mounted behind the aperture 13 to urge the film 11 firmly against the latter, and the surface of the aperture plate in contact with film 11 is preferably curved as shown to guide the film as it approaches and leaves the aperture.

Spaced a slight distance rearwardly from the aperture plate 12 to hold the film against the latter, is a guide plate 14 which is preferably attached to the vertical wall 10 so that it is supported independently of the aperture plate. Slots 15 are formed in the guide plate 14 and the aperture plate 12 to receive movable pins of the film advancing mechanism about to be described, while holes 16 are likewise formed in both plates to receive registry pins which intermittently hold the film stationary.

The film advancing mechanism includes a pair of pins 20 which are driven by a pair of eccentrics 21 and 22 so as to engage sprocket holes 23 of the film 11, move downwardly carrying the film with them, retract rearwardly until free of the film, and then move upwardly to repeat the cycle. As is hereinafter described in greater detail, this movement is provided by the cooperation of eccentrics 21 and 22 which are mounted on shafts 25 and 26, respectively, shown in Fig. 8. These shafts are supported by bosses 27 and 28 respectively, preferably formed integrally with the vertical plate 10 to insure the maintenance of the proper support and alignment, while bushings 30 may be mounted in the bosses to support the shafts and provide the proper bearing surfaces.

A gear 31 is mounted on shaft 25, preferably on the end of the latter opposite the eccentric 21, and a similar gear is mounted on shaft 26 to mesh with gear 31 so that the two shafts are driven at identical speeds but in the opposite directions. Since shafts 25 and 26 are interconnected by gears 31 and 32, either may act as the drive shaft, and in Fig. 8 I have indicated an extension 33 on shaft 25 which may be fitted with a drive gear, a crank or other suitable driving means (not shown).

Pivotally attached to eccentric 22 by suitable means such as a screw 35 is a crank arm 36 which extends from the eccentric toward the aperture plate 12; and at its forward end, the crank arm is provided with a cross member 37 carrying film-advancing or pull-down pins 20 which move in slots 15. The pull-down pins 20 are shaped to fit into sprocket holes 23 located along the edges of film 11, and the crank arm 36 is moved so that the pins engage the film and move it downwardly the distance of one "frame." This movement of the crank arm 36 is secured by connecting it to eccentric 21 so that as eccentric 22 is rotated, eccentric 21 acts as a movable fulcrum for the crank arm.

The connection between eccentric 21 and crank arm 36 is indicated in Fig. 8 where it is seen that the crank arm extends across the eccentric 21, clearing the latter, and is then offset toward the vertical plate 10 before continuing on to the cross member 37. The offset portion of crank arm 36 is designated by the numeral 40, and is axially drilled to receive a secondary crank arm 41 pivotally attached to the eccentric 21. Bushings 42 may be mounted within the offset portion 40 to permit the secondary arm to slide freely therein while preventing any appreciable looseness or wobbling between the two arms. The pull-down pins 20 are thus moved toward or away from film 11 by the rotation of eccentric 22, while the vertical movement of the pins is controlled by the effects of the combined movements of eccentrics 21 and 22.

Figure 2:
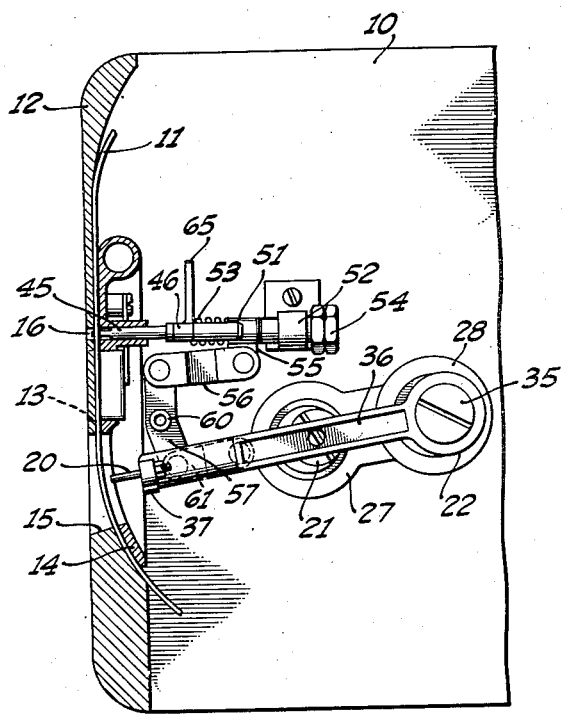
Fig. 2 is a side elevational view of the mechanism taken at 2—2 in Fig. 1.

The synchronously rotating eccentrics 21 and 22 are positioned so that both are in their rearmost positions at the same time, and consequently are simultaneously in their most forward positions at another time. As previously mentioned, the eccentrics rotate in opposite directions, and the path of the pins 20 is indicated in Fig. 9, with the corresponding position of each of the eccentrics indicated for a number of points in the cycle. If the curved line 43 is considered to be the path of film 11, it will be seen that pins 20 move into the sprocket holes 23 at point $d$ on their path and then move downwardly along the path defined by points $e$, $f$, $g$, $h$, and $i$ until the point $j$ is reached where the pins are moved rearwardly and withdrawn from the film. The pins 20 are then moved upwardly along the path defined by points, $k$, $l$, $a$, $b$, and $c$, and hence are disengaged from the film during this portion of their travel so that the film is moved only downwardly, with an intermittent motion. The position of the various elements as the pins travel through their complete cycle is indicated in Figs. 2, 3, 4 and 5. In Fig. 2, the pins 20 are at position $a$ as indicated in the path shown in Fig. 9; in Fig. 3 they are approximately in position $e$; in Fig. 4 they are in position $g$; and in Fig. 5 they are approximately in position $i$. The double eccentric mechanism shown will thus produce an intermittent advancement of film 11, and by a proper choice of the dimensions of the different elements, the film may be caused to advance exactly one frame for each cycle of operation of the eccentric mechanism, corresponding to one revolution of shaft 25.

Because of the weight of the film 11, the latter tends to continue its motion, once it has been accelerated from a stationary condition. As a result, the film will tend to continue to move downwardly after the pins 20 have ceased their downward movement and been withdrawn from the film. This is obviously unsatisfactory, since the film 11 would tend to move across aperture 13 while an exposure is being made, resulting in a blurred image. To overcome this disadvantage, holding or registry pins 45, sliding in the holes 16, are moved into sprocket holes 23 as pull-down pins 20 are removed from other sprocket holes; and the registry pins remain in their sprocket holes until the pull-down pins enter a third set of sprocket holes to advance the film another frame. At that time the registry pins 45 are retracted from the film 11 and remain clear of the latter until the pull-down pins have ceased their downward travel.

The registry pins 45 are preferably mounted above the aperture 13, and extend forwardly from a crosspiece 46 into bosses 47 surrounding holes 16 in the guide plate 14. The crosspiece 46 is attached to a plunger 50 mounted in a sleeve 51, and the latter is slidably supported in a guide 52 attached to the vertical wall 10 between the crosspiece 46 and the sleeve 51 is a spring 53 which bears against these members to urge the crosspiece, together with the registry pins 45, to a forward position. The movement of spring 53, however, is restrained by a nut 54 or other suitable means mounted on the rear end of plunger 50 to bear against the rear end of sleeve 51 and limit the forward movement of the plunger. The position of the registry pins 45 is thus normally determined by the position of the sleeve 51, which in turn is determined by a linkage connected to the crank arm 36.

Figure 6:
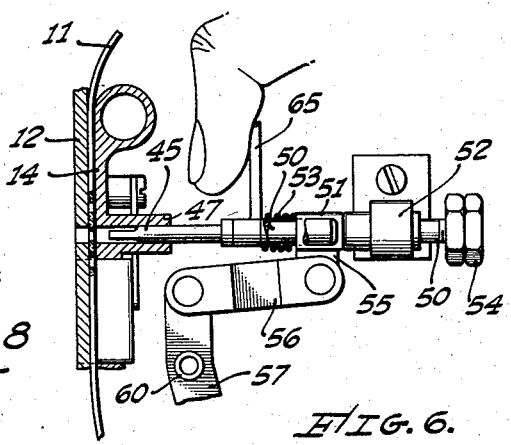
Fig. 6 is a fragmentary side elevational view showing the construction of the registry pins and the method of releasing them from the film for the purposes of inserting or removing the latter.

On the forward end of sleeve 51 I mount an ear 55, shown in Fig. 6, to which is pivotally attached a substantially horizontal link 56 whose forward end is pivotally attached to a generally vertical lever 57. The latter is rotatably mounted on the vertical wall 10 so that a fulcrum point 60 is provided, and the lower end of the lever is pivotally connected to a link 61 which in turn is pivotally connected to the crank arm 36. It may be shown that there is a point on crank arm 36 which, as the pull-down pins move up from position $j$ to position $d$, moves in a curved path which is approximately an arc of a circle, and it is this point to which the link 61 is pivotally attached. The length of link 61 is made equal to the radius of this circular arc so that as the rear end of link 61 follows this portion of its path, the forward end merely rotates and has substantially no translatory motion. During this time, the various elements are in the position shown in Fig. 2 where it is seen that the registry pins 45 are inserted in the sprocket holes 23 of the film 11.

Figure 3:
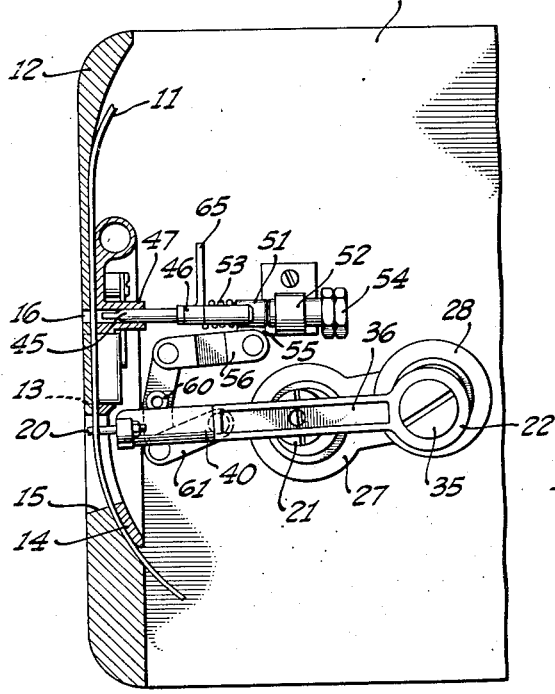
Fig. 3 is a side elevational view similar to Fig. 2 showing the relationship of the various parts as the pins enter the film preparatory to moving it downwardly.
Figure 4:
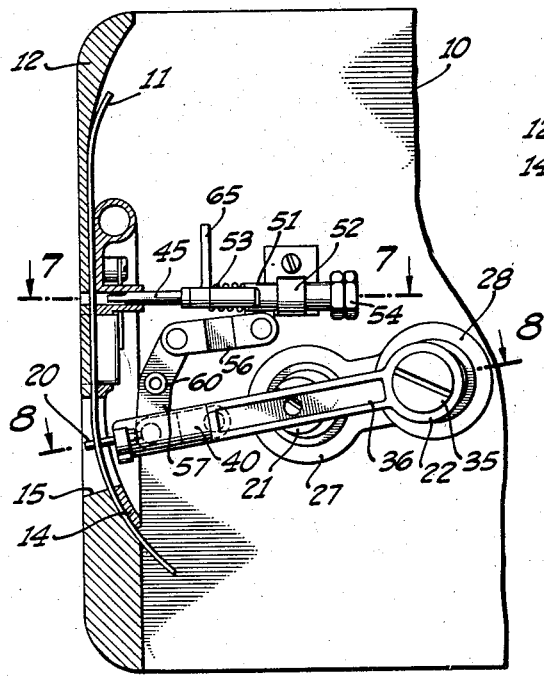
Fig. 4 is a view similar to Fig. 2 and showing the relative position of the parts as the film is moved downwardly.
Figure 5:
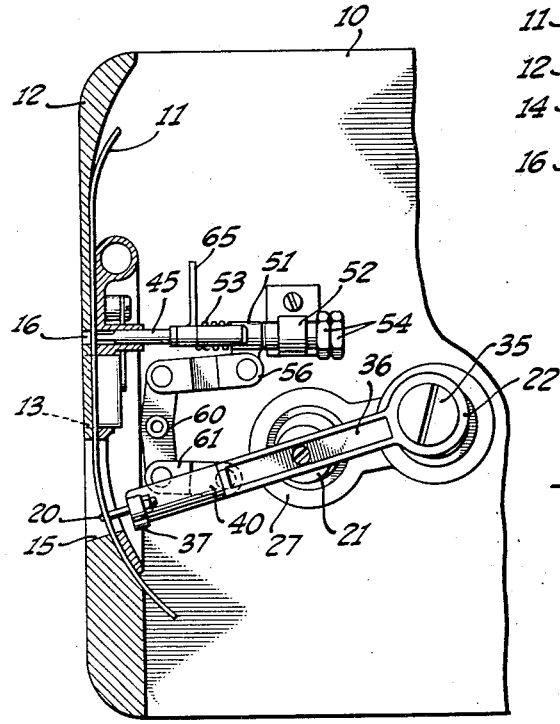
Fig. 5 is a view similar to Fig. 2 but with the parts in the position they occupy as the film advancing pins are withdrawn from the film.

At the upper end of the circular arc, the crank arm 36 moves forwardly to urge the link 61 toward the film 11 and rotate the lever 57 about its pivot point 60. This movement of the lever 57 is in a clockwise direction and forces the link 56 rearwardly, carrying with it the registry pins 45 to disengage them from the film 11. As seen in Figs. 3, 4 and 5, the registry pins remain in their rearward or retracted position while the pull-down pins 20 engage the film 11 and move it downwardly. At the lower limit of travel of the pull-down pins 20, corresponding to position $j$ of Fig. 9, these pins are retracted or moved rearwardly by the crank arm 36, which, through link 61, simultaneously rotates the lever 57 in a counterclockwise direction to reinsert the registry pins 45 in film 11. The rear end of link 61 is then moved upwardly in the circular arc as previously described, and the cycle of movement of both sets of pins is repeated. By a proper design of the length of the registry pins 45 and the elements of the linkage connecting them to the crank arm 36, the pins may be inserted in the film 11 as the pull-down pins 20 are being removed therefrom, and the registry pins removed as the pull-down pins enter the film.

Figure 7:
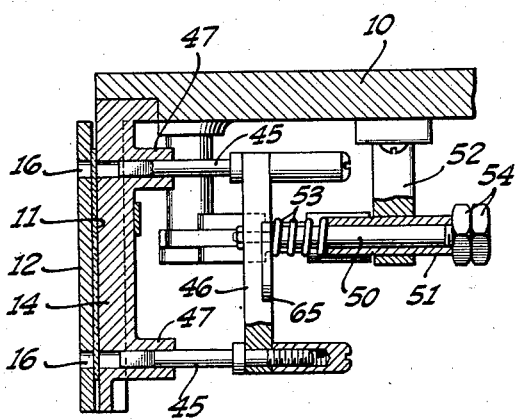
Fig. 7 is a plan view taken at 7—7 in Fig. 4 and showing further details of construction of the registry pins shown in Fig. 6.

It will thus be apparent that the registry pins 45 or the pull-down pins 20 are in the sprocket holes 23 of the film 11 at all times so that the film is held stationary when the pull-down pins are disengaged, and the film is released for movement when the pull-down pins engage it. However, since in threading the camera the film 11 is usually slid sidewise into the space between the aperture plate 12 and the guide plate 14, provision must be made for the simultaneous disengagement of both sets of pins from the film in order to effect this motion. While other means may be used, I prefer to use the system illustrated in Figs. 6 and 7 where it is seen that the registry pins 45 may be forced rearwardly out of the sprocket holes 23 while the pull-down pins 20 are in retracted position at some portion of their path between points $k$ and $c$ of the diagram shown in Fig. 9.

As previously mentioned, the crosspiece 46 carrying the registry pins 45 is mounted on the plunger 50 which is slidable within the sleeve 51, and movement of the sleeve is transmitted to the crosspiece by spring 53. The spring 53 is of such strength that all movements of the sleeve 51 are transmitted to the crosspiece 46, but the normal urging of the spring may be overcome to slide the crosspiece rearwardly with respect to the sleeve and thus remove the registry pins 45 from the sprocket holes 23. To assist in this operation, I provide an ear or extension member 65 which is attached to the crosspiece 46 and extends upwardly therefrom so that it may be readily grasped by a thumb or finger to urge the registry pins 45 rearwardly. This operation is shown in Fig. 6 where, assuming that the crank member 36 is in the position shown in Fig. 2, the crosspiece 46 is shown moved rearwardly to release the registry pins 45 from the film 11 to permit the insertion or removal of the latter between the aperture plate 12 and the guide plate 14. Upon releasing the ear 65, the registry pins are returned to their normal position by spring 53 to engage sprocket holes 23. Care should be taken, of course, to align the sprocket holes 23 with the registry pins 45 so that the latter will enter the holes easily without tending to tear the film. When this precaution has been observed, the pull-down pins 20 will align with other sprocket holes at the proper time in the cycle of operations, and the film will be moved downwardly as previously described.

From the foregoing it will be apparent that I have provided an improved film advancing mechanism which, while simple, produces superior results. No adjustments of the mechanism are necessary during its use, and it retains its quiet operation over an extended period of time. Furthermore, it is very simple to thread film through the mechanism, and the film is firmly held in the proper alignment at all times during its advance through the mechanism.

It will be understood that modifications may be made in the form of the device without departing from the spirit of the invention as disclosed herein; and while I have shown and described a preferred form of my invention, I do not wish to be limited to the particular form or arrangement of parts herein described and shown except as covered by my claims.

I claim:
1. A film advancing mechanism which includes; means for guiding a film; a pin adapted to enter a perforation in said film to move the latter; a first eccentric; a second eccentric approximately aligned with said pin and said first eccentric, said first and second eccentrics being continuously driven at the same speed; a crank arm attached to said pin to move the latter; means attaching said crank arm to said first eccentric whereby said arm is moved laterally and longitudinally by said eccentric; and means attaching said crank arm to said second eccentric whereby said arm is moved laterally by said eccentric and is free to move longitudinally with respect thereto, said arm being momentarily aligned with a line passing through the axes of said eccentrics during the rotation of the latter.

2. A film advancing mechanism which includes: means for guiding a film; a pin adapted to enter a perforation in said film to move the latter; a first eccentric adapted to be rotated; a crank arm attached to said pin to move the latter and rotatably attached to said first eccentric; a second eccentric adapted to be rotated at the same speed and in the opposite direction to said first eccentric; and means connecting said crank arm to said second eccentric for rotation with respect thereto and for sliding movement along a line passing through said eccentric, said eccentrics being rotationally positioned with respect to each other so that said crank arm is momentarily aligned with a straight line joining the axes of said eccentrics and the points of connection of said arm thereto as said eccentrics are rotated.

3. A film advancing mechanism which includes: means for guiding a film; a pull-down pin adapted to enter a perforation in said film to move the latter; a first eccentric adapted to be rotated; a crank arm attached to said pin to move the latter and rotatably attached to said first eccentric; and a second eccentric rotatably and slidably attached to said crank arm whereby said pull-down pin is moved to engage said film, move the latter ownwardly, disengage said film, and then move upwardly preparatory to reengaging said film, the movement of said crank arm and said pin being determined solely by the action of said eccentrics, said eccentrics being rotated in opposite directions but at the same speed, and relatively positioned so that the separate points of connection to said crank arm are momentarily simultaneously aligned with the line connecting the axes of said eccentrics as the latter are rotated.

4. A film advancing mechanism as described in claim 3 having a registry pin normally engaging said film when said pull-down pin is disengaged therefrom, said registry pin being spring mounted with respect to its operating mechanism and movable against the urging of said spring to disengage said film.

5. A film advancing mechanism which includes: means for guiding a film; a pull-down pin adapted to enter a perforation in said film to move the latter; a crank arm attached to said pin to move the latter; a first eccentric; means slidably and rotatably connecting said crank arm to said first eccentric; a second eccentric laterally displaced from said first eccentric and adapted to be rotated in synchronism therewith but in the opposite direction; and means rotatably connecting said arm to said second eccentric, positioned to be aligned with the line joining the axes of said eccentrics at the same time said slidable and rotatable means is aligned therewith, whereby said second eccentric pivots said arm about said first eccentric as a fulcrum, and said fulcrum is moved as said arm is pivoted to give a generally elliptical path to said pull-down pin, whereby said pin is inserted in said film at one end of said generally elliptical path, moves said film, is withdrawn therefrom at the other end of said path, and is returned to said first mentioned end of said path without engaging said film.

6. A film advancing mechanism which includes: means for guiding a film; a pull-down pin adapted to enter a perforation in said film to move the latter; a crank arm attached to said pull-down pin and extending away from said film in a direction generally perpendicular thereto; a first eccentric; means connecting the free end of said crank arm to said first eccentric; a second eccentric between said pull-down pin and said first eccentric; a stem slidably connected to said crank arm for longitudinal movement with respect thereto, and rotatably attached to said second eccentric to be aligned with the line connecting the axes of said eccentrics at the same time said connecting means is aligned therewith; and driving means adapted to rotate said first and second eccentrics continuously and in synchronism.

7. A film advancing mechanism which includes: means for guiding a film; a pull-down pin adapted to enter a perforation in said film to move the latter; a crank arm attached to said pull-down pin and extending away from said film in a direction generally perpendicular thereto; a first eccentric; a crank pin connecting the free end of said crank arm to said first eccentric; a second eccentric between said pull-down pin and said first eccentric; gears connecting said first and second eccentrics for simultaneous rotation in opposite directions and at the same rotational speed; a stem slidably connected to said crank arm for longitudinal movement with respect thereto and rotatably attached to said second eccentric; a registry pin adapted to engage a perforation of said film; a link having one end pivotally connected to said crank arm intermediate said pull-down pin and said second eccentric; a medially pivoted link having one end pivotally connected to the free end of said first-mentioned link; a third link having one end pivotally attached to the free end of said medially pivoted link, and the other end pivotally connected to said registry pin, whereby said registry pin is removed from said film when said pull-down pin enters said film, and is inserted in said film when said pull-down pin is removed therefrom; and resilient means interposed between the film engaging end of said registry pin and the point of connection of said third link thereto, whereby said registry pin may be moved out of said film while said pull-down pin is removed therefrom.

8. A film advancing mechanism which includes: means for guiding a film; a pull-down pin adapted to enter a perforation in said film to move the latter; a crank arm attached to said pull-down pin and extending away from said film in a direction generally perpendicular thereto; a first eccentric; means connecting the free end of said crank arm to said first eccentric; a second eccentric; gears connecting said first and second eccentrics for simultaneous rotation in opposite directions and at the same rotational speed; means slidably and rotatably connecting said crank arm to said second eccentric; a registry pin adapted to engage a perforation of said film; a link having one end pivotally connected to said crank arm intermediate said pull-down pin and said second eccentric; a medially pivoted link having one end pivotally connected to the free end of said first-mentioned link; a third link having one end pivotally attached to the free end of said medially pivoted link, and the other end pivotally connected to said registry pin, whereby said registry pin is removed from said film when said pull-down pin enters said film, and is inserted in said film when said pull-down pin is removed therefrom; and resilient means interposed between the film engaging end of said registry pin and the point of connection of said third link thereto, whereby said registry pin may be moved out of said film while said pull-down pin is removed therefrom.

9. A film advancing mechanism which includes: means for guiding a film; a pull-down pin adapted to enter a perforation in said film to move the latter; a crank arm attached to said pull-down pin and extending away from said film in a direction generally perpendicular thereto; a first eccentric; a crank pin connecting the free end of said crank arm to said first eccentric; a second eccentric between said pull-down pin and said first eccentric; gears connecting said first and second eccentrics for simultaneous rotation in opposite directions and at the same rotational speed; a stem slidably connected to said crank arm for longitudinal movement with respect thereto and rotatably attached to said second eccentric; a registry pin adapted to engage a perforation of said film; a link pivotally connected to said crank arm; a second link pivotally connected to the free end of said first-mentioned link; a third link pivotally attached to said second link and to said registry pin, whereby said registry pin is removed from said film when said pull-down pin enters said film, and is inserted in said film when said pull-down pin is removed therefrom; and resilient means interposed between the film engaging end of said registry pin and the point of connection of said third link thereto, whereby said registry pin may be moved out of said film while said pull-down pin is removed therefrom.

10. A film advancing mechanism which includes: means for guiding a film; a pull-down pin adapted to enter a perforation in said film to move the latter; a crank arm attached to said pull-down pin and extending away from the film in a direction generally perpendicular thereto; a first eccentric; a crank pin connecting said crank arm to said first eccentric; a second eccentric intermediate said pull-down pin and said first eccentric; gear means driving said first and second eccentrics in opposite directions at the same rotational speed; means slidably and rotatably connecting said second eccentric to said crank arm; a registry pin adapted to engage a perforation of said film; a slidable member connected to said registry pin to operate the latter; a multi-link operating means connected between said slidable member and a point on said crank arm intermediate said pull-down pin and said second eccentric; and resilient means interposed between said slidable member and said registry pin, whereby the latter may be moved with respect to said slidable member, out of said film.

11. A film advancing mechanism which includes: means for guiding a film; a pull-down pin adapted to enter a perforation in said film to move the latter; a crank arm attached to said pull-down pin and extending away from the film in a direction generally perpendicular thereto; a first eccentric; means connecting said crank arm to said first eccentric; a second eccentric; gear means driving said first and second eccentrics in opposite directions at the same rotational speed; means slidably and rotatably connecting said second eccentric to said crank arm; a registry pin adapted to engage a perforation of said film; a slidable member connected to said registry pin to operate the latter; a multi-link operating means connected between said slidable member and a point on said crank arm intermediate said pull-down pin and said second eccentric; and resilient means interposed between said slidable member and said registry pin, whereby the latter may be moved with respect to said slidable member, out of said film.

12. A film advancing mechanism which includes: means for guiding a film; a pull-down pin adapted to enter a perforation in said film and move the latter; a crank arm attached to said pin to move the latter; a first eccentric; means slidably and rotatably connecting said crank arm to said first eccentric; a second eccentric laterally displaced from said first eccentric and adapted to be rotated in synchronism therewith but in the opposite direction; means rotatably connecting said arm to said second eccentric, whereby the latter pivots said arm about said first eccentric as a fulcrum, and said fulcrum is moved as said arm is pivoted to give a generally elliptical path to said pull-down pin, whereby said pin is inserted in said film at one end of said generally elliptical path, moves said film, is withdrawn therefrom at the other end of said path, and is returned to said first-mentioned end of said path without engaging said film; a registry pin adapted to engage a perforation in said film; linkage means adapted to insert said registry pin in said film when said pull-down pin is removed therefrom, and remove said registry pin from said film when said pull-down pin is inserted therein; and spring means connecting said registry pin to said linkage means whereby the normal urging of said spring may be overcome to move said registry pin out of engagement with said film while said pull-down pin is disengaged therefrom.

13. A film advancing mechanism which includes: means for guiding a film; a pull-down pin adapted to enter a perforation in said film to move the latter; a crank arm attached to said pull-down pin and extending away from said film in a direction generally perpendicular thereto; a first eccentric; means connecting the free end of said crank arm to said first eccentric; a second eccentric between said pull-down pin and said first eccentric; a stem slidably connected to said crank arm for longitudinal movement with respect thereto, and rotatably attached to said second eccentric; driving means adapted to rotate said first and second eccentrics continuously and in synchronism; a registry pin adapted to engage a perforation in said film; linkage means adapted to insert said registry pin in said film when said pull-down pin is removed therefrom, and remove said registry pin from said film when said pull-down pin is inserted therein; and spring means connecting said registry pin to said linkage means whereby the normal urging of said spring may be overcome to move said registry pin out of engagement with said film while said pull-down pin is disengaged therefrom.

ROBERT P. SHEA.

REFERENCES CITED

The following references are of record in the file of this patent:

UNITED STATES PATENTS

| Number | Name | Date |
|---|---|---|
| 1,891,585 | Vinten | Dec. 20, 1932 |
| 2,382,772 | Canady | Aug. 14, 1945 |

FOREIGN PATENTS

| Number | Country | Date |
|---|---|---|
| 221,426 | Great Britain | Sept. 11, 1924 |

Certificate of Correction

Patent No. 2,457,409.  December 28, 1948.

ROBERT P. SHEA

It is hereby certified that error appears in the printed specification of the above numbered patent requiring correction as follows:

Column 7, line 27, claim 3, for "ownwardly" read *downwardly*;

and that the said Letters Patent should be read with this correction therein that the same may conform to the record of the case in the Patent Office.

Signed and sealed this 20th day of September, A. D. 1949.

[SEAL]

JOE E. DANIELS,
*Assistant Commissioner of Patents.*